July 7, 1964

P. GIRAULT 3,140,488

MISS DISTANCE INDICATOR

Filed Dec. 14, 1961

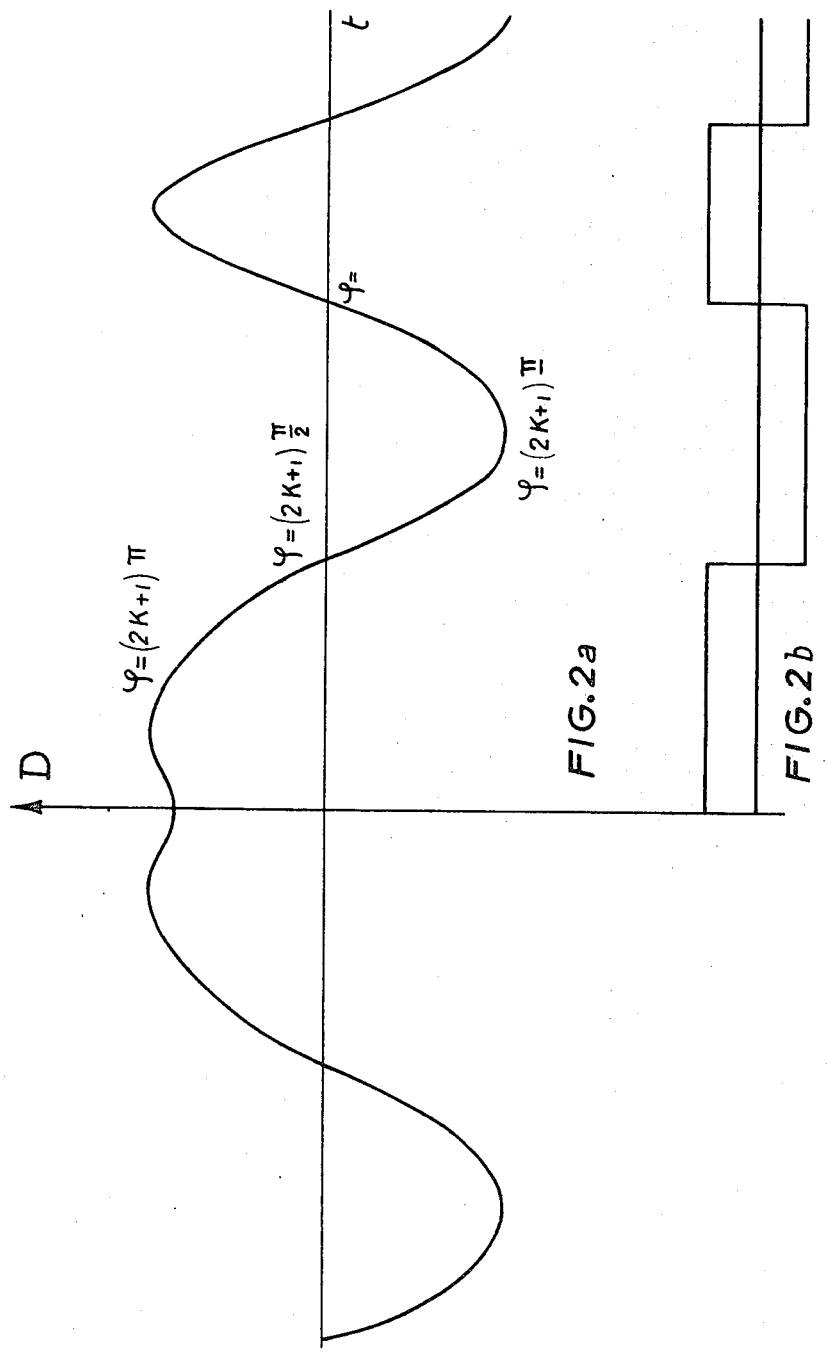

United States Patent Office 3,140,488
Patented July 7, 1964

3,140,488
MISS DISTANCE INDICATOR
Pierre Girault, Paris, France, assignor to C.S.F.-Compagnie Generale de Telegraphie Sans Fil, a corporation of France
Filed Dec. 14, 1961, Ser. No. 159,374
Claims priority, application France Dec. 15, 1960
6 Claims. (Cl. 343—12)

The present invention relates to systems for instantly measuring the distance between two objects, at least one of which is moving.

The knowledge of this distance may be of great importance, for example, when one object is a target and the other a missile which carries a proximity fuze which is to be detonated or fired at a predetermined distance from the target.

In a system according to the invention for measuring the distance between two objects, at least one of which is moving, there are provided on one of these objects: two transmitters respectively transmitting ultra-high frequency signals on two frequencies close to each other; a receiver for directly receiving said two signals and for receiving the respective echoes of said signals transmitted by said other object; means for detecting the respective Doppler frequency signals of said echo signals; means for deriving respective pulses each time a Doppler signal is equal to zero; and AND-gate having two inputs respectively for receiving said pulses and an output; and a counter coupled to said output and thus controlled by said AND-gate for starting upon first simultaneous reception of said two pulses, and stopping upon second simultaneous reception of said pulses.

The invention will be best understood from the following description and appended drawings, wherein:

FIGS. 2a, 2b and 3 are three further diagrams showing the operation of the system according to the invention;

The invention makes use of the Doppler effect.

It will be assumed in the following that the relative motion of a target C and a missile E with respect to each other may be considered as a displacement, wherein the target is stationary and the missile describes a rectilinear trajectory in the vicinity of the target.

Figure 1:
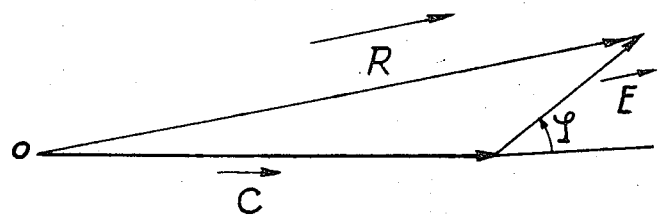
FIG. 1 is an explanatory diagram of the invention.

If a transmitter carried by the target transmits a pure continuous wave with a frequency $f_0$, this will provide at the target, as shown in FIG. 1, an electrical field vector $\vec{C}$, which is directly due to this transmission. Assuming the phase of this vector to be the origin, a further field vector $\vec{E}$ will exist at the target due to reflection of the transmitted wave on the missile, this vector being phase-shifted by an angle $\varphi$. If a receiver aerial is carried by the target, in addition to the transmitter aerial, it will collect a field vector $\vec{R}$, which is the geometric sum of $\vec{C}$ and $\vec{E}$, the phase-shift $\varphi$ between vectors $\vec{C}$ and $\vec{E}$ being given by the formula $$\varphi = \frac{4\pi f}{c} r \qquad (1)$$

where $r$ is the distance between the missile and the target and $c$ the velocity of the electromagnetic waves.

If the missile has a certain velocity relative to the target, $r$ varies. In fact, $\vec{E}$ has an amplitude which varies but slowly with respect to the variation of phase Vector $\vec{R}$ is a maximum for $$\varphi = 2K\pi, \text{ and } 2r = \frac{Kc}{2f} = \frac{K\lambda_1}{2}$$

and a minimum for $$\varphi = (2K+1)\pi, \text{ and } r = \frac{(2K+1)\lambda_1}{4}$$

where K is an integer and $\lambda_1$ the operating wave-length.

The Doppler signal is obtained at the receiver by the detection of signal $\vec{R}$. This low-frequency signal, after elimination of the D.C. component, corresponding to vector $\vec{C}$ of a constant amplitude and phase, is a D.C. signal corresponding to vector $\vec{E}$. The amplitude of this signal may be considered to be constant in the vicinity of the target. This Doppler signal D is shown in FIG. 2a, which illustrates the variations hereof as a function of time. This signal is of the form cos $\Omega(t)t_0$. It passes through a maximum at time $t$ corresponding to $\varphi = 2K$, then through a minimum at time $t$ corresponding to $\varphi = (2K+1)\pi$ and is cancelled for $$\varphi = (2K+1)\frac{\pi}{2}$$

$\Omega$ being the angular speed due to the Doppler effect.

In other words, each time the path of the missile crosses a sphere, the radius of which is given by the following relation:

$$\varphi = (2K+1)\frac{\pi}{2}$$

corresponding to cos $\Omega t=0$, the Doppler signal is cancelled. Since the radius $r$ of such a sphere is given by $$\frac{4\pi f}{c} \cdot r = (2K+1)\frac{\pi}{2}$$

Accordingly $$r = (2K+1)\frac{\lambda_1}{8} \qquad (2)$$

Figure 3:
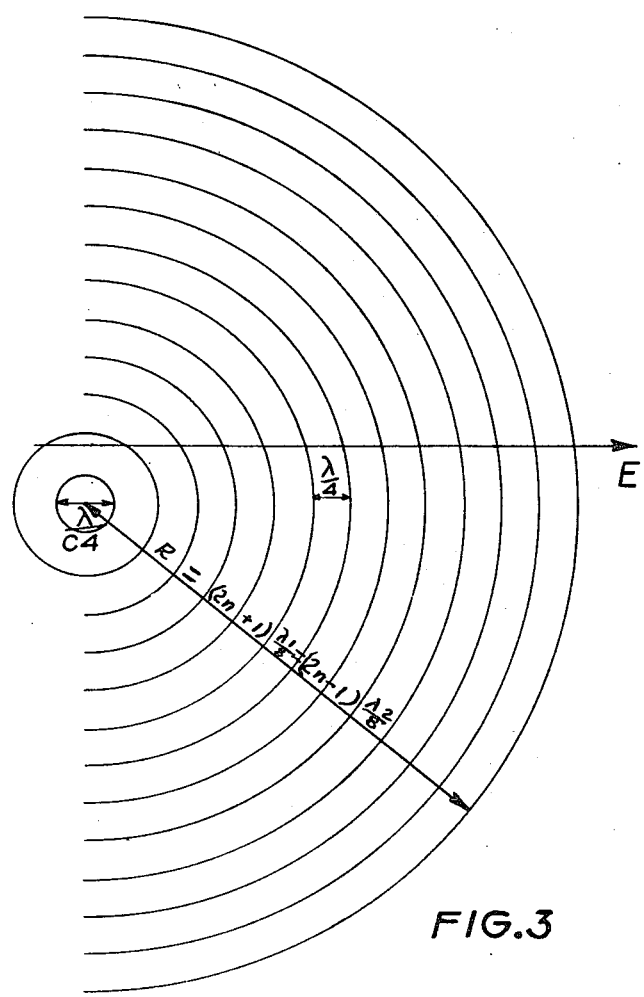

The family of spheres having their respective radii equal to $$(2n+1)\frac{\lambda_1}{8}$$

are shown FIG. 3. The knowledge of the number of spheres of radius $r$ which have been crossed by the missile, counting from a point located at a fixed distance from the target, and until its passage at the minimum distance from the target will thus make it possible to determine, to within $$\frac{\lambda_1}{4}$$

the minimum distance of the missile from the target during its motion.

In order to define the locus of points at a fixed distance from the target, the invention associates two transmitters with one of the two objects, for example with the target. These transmitters transmit on two different frequencies $F_1$ and $F_2$, respectively, corresponding to wave lengths in the free space $\lambda_1$ and $\lambda_2$, with $\lambda_2 > \lambda_1$ and $\lambda_2 \neq \lambda_1$.

If $\lambda_1$ and $\lambda_2$ are selected in such a manner that:

$$(2n+1) \cdot \frac{\lambda_1}{8} = [2(n-1)+1] \cdot \frac{\lambda_2}{8} = (2n-1) \cdot \frac{\lambda_2}{8} \qquad (3)$$

where $n$ is an integer, the Doppler signals corresponding to frequencies $F_1$ and $F_2$ will cancel simultaneously when the missile is at a distance $$R = (2n+1) \cdot \frac{\lambda_1}{8}$$

from the target i.e., on a sphere having a radius equal to R.

Moreover, the Doppler signals corresponding to frequency $F_1$ are on this sphere in phase opposition with those corresponding to frequency $F_2$, since distance R corresponds, for one of the vibrations, to $$(2n+1) \cdot \frac{\lambda_1}{8}$$

and for the other, to $$(2n-1) \cdot \frac{\lambda_2}{8}$$

In terms of wave lengths, this distance corresponds to a shift of a quarter-wave length, between the echo signals.

There are other spheres corresponding to a simultaneous cancellation of the Doppler signals, and it can be shown that their radii are multiples of the radius of this sphere. Threshold devices will be provided for eliminating signals originating at such spheres.

Figure 4:
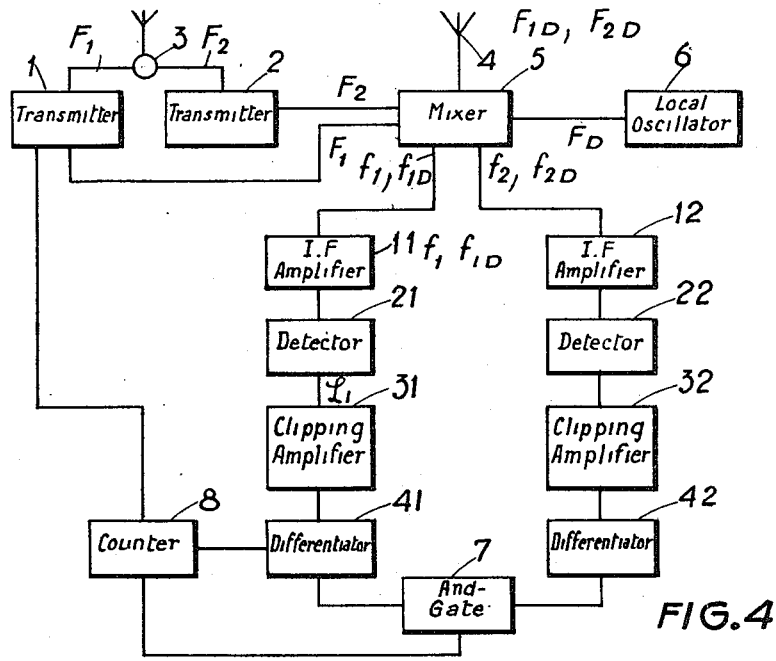
FIG. 4 is a block diagram of a system according to the invention.

FIG. 4 illustrates an arrangement according to the invention. It is carried by the target and comprises two transmitters 1 and 2, transmitting on frequencies $F_1$ and $F_2$, respectively. These two transmitters feed the transmitter aerial 3 and transmit continuous wave signals.

A receiver aerial 4 receives the signal from the missile at frequencies $F_{1D}$ and $F_{2D}$, the two signals being affected by the Doppler effect.

A threshold mixer 5 receives directly the signals having frequencies $F_1$ and $F_2$ and, through aerial 4, the signals having frequencies $F_{1D}$ and $F_{2D}$.

A local oscillator 6 of frequency $F_0$ translates the beat frequencies $F_1 - F_{1D}$ and $F_2 - F_{2D}$ into immediate frequencies.

The system includes two stages, respectively comprising intermediate frequency amplifiers 11 and 12, detectors 21 and 22, clipping amplifiers 31 and 32, and differentiators 41 and 42, which are connected in series. An AND-gate 7, which receives the signal derived from the two clippers 41 and 42, feeds a counter 8 which is connected, for example, to transmitter 1.

The system operates as follows: the threshold mixer starts providing output signals only when the missile is at a distance only slightly higher than R. The intermediate frequency output signals of frequencies $f_1 - f_{1D}$, $f_2 - f_{2D}$ include the phase information contained in signals having the frequencies $F_{1D}$ and $F_{2D}$. In fact this threshold mixer comprises, as known, a conventional mixer, associated with a threshold clipper, having a predetermined output level. If the output signal is lower than this level, no signal appears at the output of the device.

Figure 5:
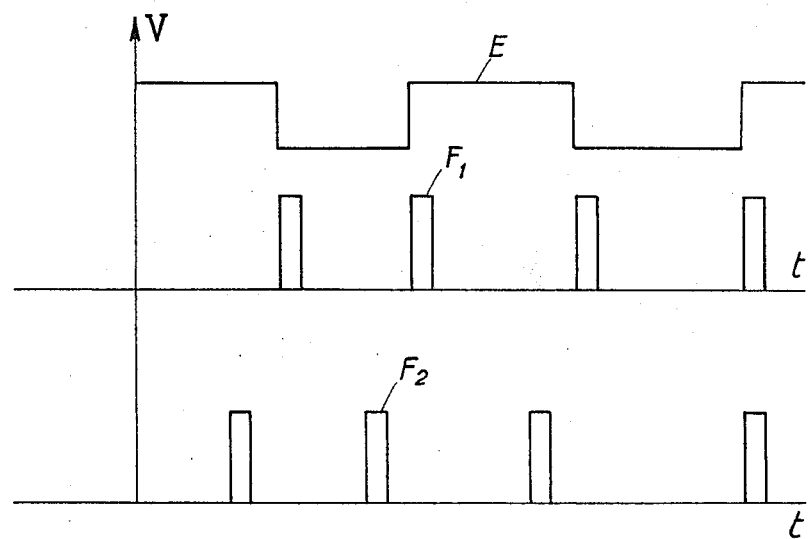
FIG. 5 shows the signals occurring at the input of an element of the arrangement shown in FIG. 4.

Beat frequency signal $f_1 - f_{1D}$ is then demodulated in demodulator 21 which delivers at its output a Doppler signal $\varphi_1$, such as that illustrated in FIG. 2a. This signal is clipped by amplifier 31 to provide signal E shown in FIG. 5 and differentiated by differentiator 41 to provide signal $F_1$. The same procedure takes place in the second stage which provides signal $F_2$.

Thus, at the input of gate 7, pulses $F_1$ and $F_2$ occur upon cancellation of the corresponding Doppler signals. The signals first coincide at the inputs of gate 7 when the missile is anywhere on the virtual sphere centered at 0 and having a radius R as shown in FIGURE 1. The coincidences occurring at higher distances from the target are not noticed, due to the action of the threshold mixer 5. Gate 7 starts a counter 8 which counts the pulses derived from differentiator 41, i.e. the pulses which occur at each cancellation of the Doppler signal. In other terms, a pulse is produced each time the missile passes a sphere in FIG. 3. The counter is stopped at the second coincidence, i.e. when the missile will have left the sphere of radius R. Such counters are well known in the art. Thus, the number of spheres crossed by the missile will indicate, to within $$\frac{\lambda_1}{4}$$

the minimum distance thereof from the target. Once the count of the performed counter has been performed, its information may be transmitted by means of one of transmitters 1 or 2.

Since the minimum error is $$\frac{\lambda_1}{4}$$

the accuracy of the measurement will of course depend on the choice of the wave length $\lambda_1$.

Alternatively, two pulse counters may be used instead of one, thus substantially reducing the systematic error, since, in this manner, the position of the missile is encompassed by two spheres in each set of spheres. It may be noted that when the distance from the missile to the target is equal to about $$\frac{R}{2}$$

the two Doppler signals are in quadrature; $\lambda_1$ and $\lambda_2$ being close to each other, the distance between two adjacent spheres corresponding, one to $\lambda_1$, the other to $\lambda_2$, may be as small as $$\frac{\lambda_1}{8}$$

Another cause of error lies in the more or less accurate sensing by gate 7 of the simultaneous occurrence of the beats.

The phase difference between the two Doppler signals $D_1$ and $D_2$ varies continuously as a function of the instantaneous distance $r$ from the missile to the target in accordance with the relation $$\Phi = \frac{4\pi}{c} \cdot r(F_2 - F_1)$$

$F_1$ and $F_2$ being the respective frequencies of the two transmitters.

If $r$ varies by $\Delta r$, this will result in a variation of $\Phi$ by $$\Delta \Phi = 4\pi \cdot \frac{F_2 - F_1}{c} \Delta r$$

Specifically, when $$\Delta r = \frac{\lambda}{4}$$

i.e. when the missile passes from one sphere to the following, since $$\frac{\lambda}{4} = \frac{cT}{4} = \frac{c}{4F}$$

with T being the period and F the mean value of $F_1$ and $F_2$, one has $$\Delta r = \frac{c}{4F} \text{ and } \Delta \Phi = \pi \frac{F_1 - F_2}{F}.$$

The difference of position in time $\Delta \tau$ between the pulses corresponding to the passage through zero of both Doppler signals will then be given by the following relation $$\Delta \tau = \frac{\Delta \Phi}{\omega_b}$$

$\omega_b$ and $f_b$ being respectively the angular frequency and the mean frequency of both Doppler signals, the respective frequencies and angular frequencies of which are very close to one another. Thus $$\Delta \tau = \frac{\Delta \Phi}{2\pi f_B} = \frac{2}{2f_B} = \frac{F_1 - F_2}{F}$$

In order to determine the coincidences, the AND-gate 7 must be capable of sensing the shift between two pulses spaced by $\Delta\tau$; therefore the width of the pulses must be smaller than $\Delta\tau$.

In one system of the above type, the error allowed being 40 cm., one had $$\frac{\lambda}{4} = 40 \text{ cm.}$$

and $\lambda = 1$ m. 60, $F_1 = 200$ mc./s.

The radius R of the sphere was selected to be equal to 50 m. and the Doppler signals had to be opposite in phase for this distance.

$$\Phi = \frac{4\pi}{c}(F_1 - F_2)r = \pi$$

and $$F_1 - F_2 = \frac{\pi c}{4R} = 1.5 \cdot 10^6 = 1.5 \text{ mc./s.}$$

Assuming the relative velocity of the missile to be 1500 m./s., then $$F_B = \frac{2V_R}{\lambda} = 2000 \text{ c./s.}$$

and $\Delta\tau = 2$ μsec.

Since the aerials must detect the target along any direction, they will be of the omni-directional type. Simple calculation based on the radar equation, assuming that the reflecting surface of the missile is 0.1 m.$^2$, shows that the transmitted power must be of the order of 5 to 80 mw., according to the radius R.

Figure 6:
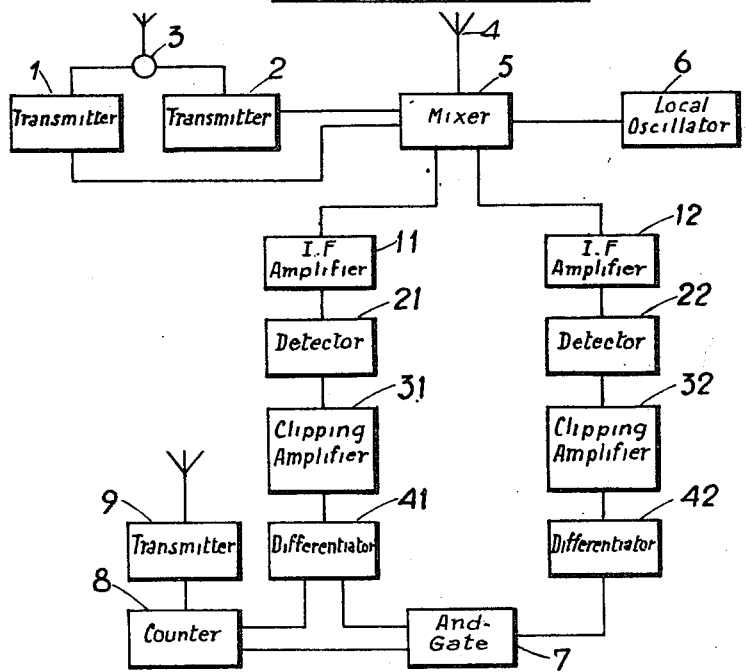
FIGS. 6 and 7 are two further embodiments of the system according to the invention.
Figure 7:
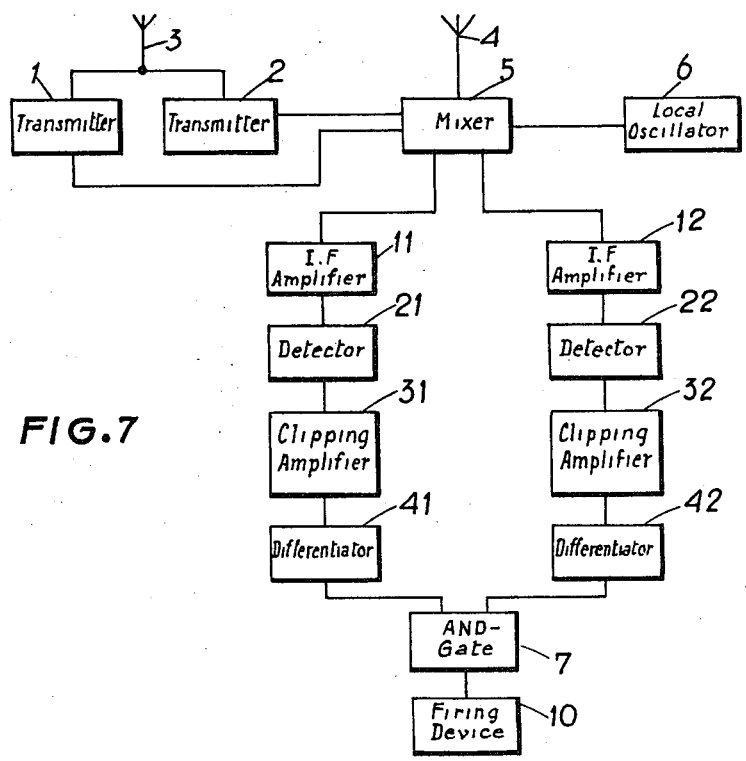

FIGS. 6 and 7, where the same reference numerals designate the same elements as those in FIG. 4 show two modifications.

In FIG. 6 the AND-gate feeds a separate transmitter 8 which transmits to ground the information, as to the instantaneous position of the missile.

In the embodiment illustrated in FIG. 7, the unit is mounted on the missile. Selector 7 is used for controlling a firing device or a proximity fuze 10, as soon as the missile is at a predetermined distance R from the target.

It is to be understood that the invention is not limited to the embodiments shown, which are given only by way of example.

What is claimed, is:

1. A system for measuring the instantaneous distance, between two objects in relative motion with respect to each other comprising, carried by one of said objects: two transmitters respectively transmitting ultra-high frequency signals on two frequencies close to each other; a receiver for directly receiving said two signals and for receiving the respective echoes of said signals transmitted by said other object; means for detecting the respective Doppler frequency signals of said echo signals; means for deriving respective pulses each time a Doppler signal is equal to zero; and AND-gate having two inputs for receiving respectively said pulses and an output; and a counter coupled to said output and thus controlled by said AND-gate for starting upon first simultaneous reception of said two pulses and stopping upon second simultaneous reception of said pulses.

2. A system for measuring the instantaneous distance, between two objects in relative motion with respect to each other, comprising, carried by one of said objects: two transmitters respectively transmitting ultra-high frequency signals on two frequencies close to each other; a receiver for directly receiving said two signals and for receiving the respective echoes of said signals transmitted by said other object; means for detecting the respective Doppler frequency signals of said echo signals; means for clipping said received signals at a predetermined threshold level; means for deriving respective pulses each time a Doppler signal is equal to zero; an AND-gate having two inputs for receiving respectively said pulses and an output; and a counter coupled to said output and thus controlled by said AND-gate for starting upon first simultaneous reception of said two pulses, and stopping upon second simultaneous reception of said pulses.

3. A system for measuring the instantaneous distance between two objects in relative motion with respect to each other comprising, carried by one of said objects: two transmitters respectively transmitting ultra-high frequency signals on two frequencies close to each other; a receiver for directly receiving said two signals and for receiving the respective echoes of said signals transmitted by said other object; means for detecting the respective Doppler frequency signals of said echo signals; a threshold mixer, for detecting, over a predetermined threshold level, the respective Doppler frequencies of said echo signals; two detectors, two clipping signal amplifiers, two differentiators, connected in series to said mixer, for respectively deriving from said Doppler signals two respective series of pulses, occurring each time the corresponding Doppler signal is equal to zero; and AND-gate having two inputs for receiving respectively said pulses and an output; and a counter coupled to said output and thus controlled by said AND-gate for starting upon first simultaneous reception of said two pulses and stopping upon second simultaneous reception of said pulses.

4. A system for measuring the instantaneous distance, between two objects in relative motion with respect to each other comprising, carried by one of said objects; two transmitters respectively transmitting ultra-high frequency signals on two frequencies close to each other; a receiver for directly receiving said two signals and for receiving the respective echoes of said signals transmitted by said other object; means for detecting the respective Doppler frequency signals of said echo signals; a threshold mixer, for detecting, over a predetermined threshold level, the respective Doppler frequencies of said echo signals; two detectors, two clipping signal amplifiers, two differentiators connected in series to said mixer, for respectively deriving from said Doppler signals two respective series of pulses, occurring each time the corresponding Doppler signal is equal to zero; an AND-gate having two inputs for receiving respectively said pulses and an output; a counter coupled to said output and thus controlled by said AND-gate for starting upon first simultaneous reception of said two pulses and stopping upon second simultaneous reception of said pulses; and means for coupling said counter to one of said transmitters.

5. A system for measuring the instantaneous distance, between two objects in relative motion with respect to each other comprising carried by one of said objects; two transmitters respectively transmitting ultra-high frequency signals on two frequencies close to each other; a receiver for directly receiving said two signals and for receiving the respective echoes of said signals transmitted by said other object; means for detecting the respective Doppler frequency signals of said echo signals; a threshold mixer, for detecting, over a predetermined threshold level, the respective Doppler frequencies of said echo signals; two detectors, two clipping signal amplifiers, two differentiators, connected in series to said mixer, for respectively deriving from said Doppler signals two respective series of pulses, occurring each time the corresponding Doppler signal is equal to zero; an AND-gate having two inputs for receiving respectively said pulses and an output; a counter coupled to said output and thus controlled by said AND-gate for starting upon first simultaneous reception of said two pulses and stopping upon second simultaneous reception of said pulses; a firing device; and means for connecting said counter to said firing device, for controlling it when the distance between said objects reaches a predetermined value.

6. A system for measuring the instantaneous distance, between two objects in relative motion with respect to each other comprising carried by one of said objects; two transmitters respectively transmitting ultra-high frequency signals on two frequencies close to each other; a receiver for directly receiving said two signals and for receiving the respective echoes of said signals transmitted by said other object; means for detecting the respective Doppler frequency signals of said echo signals; a threshold mixer, for detecting, over a predetermined threshold level, the respective Doppler frequencies of said echo signals; two detectors, two clipping signal amplifiers, two differentiators, connected in series to said mixer, for respectively deriving from said Doppler signals two respective series of pulses, occurring each time the corresponding Doppler signal is equal to zero; an AND-gate having two inputs for receiving respectively said pulses and an output; a counter coupled to said output and thus controlled by said AND-gate for starting upon first simultaneous reception of said two pulses and stopping upon second simultaneous reception of said pulses, a third transmitter; and means for controlling said second transmitter by said counter, for constantly transmitting an information concerning the instantaneous distance between said two objects.

No references cited.